UNITED STATES PATENT OFFICE.

CARLETON ELLIS, OF MONTCLAIR, NEW JERSEY.

HYDROGENATED-OIL COMPOSITION.

1,276,508.  Specification of Letters Patent.  Patented Aug. 20, 1918.

No Drawing. Continuation of application filed January 6, 1913, Serial No. 740,416. This application filed April 21, 1917. Serial No. 163,738.

*To all whom it may concern:*

Be it known that I, CARLETON ELLIS, a citizen of the United States, residing at Montclair, in the county of Essex and State of New Jersey, have invented certain new and uesful Improvements in Hydrogenated-Oil Composition, of which the following is a specification.

The present invention relates to a composition of matter containing a normally solid hydrogenated oil, preferably of high melting point, combined or incorporated with a solid non-fatty material, for example, pulverized talc.

The present application constitutes a continuation of matter disclosed in my application filed January 6, 1913, Serial No. 740,416, renewed August 1, 1916, Serial No. 112,614.

In preparing my composition forming the subject matter of the present invention, for example, I catalytically hydrogenate an oil, such as a semi-drying fatty oil of the nature of cottonseed oil or a mixture of this with corn oil in the manner known to the art, until the iodin number of the mixture is reduced to say approximately 33. I then mix intimately, for example, 10 parts of this hydrogenated oil with a suitable finely comminuted material, for example, talc 4 parts or in this specific instance 40% of the weight of the hydrogenated oil. It is noted, however, that the present invention is not restricted to the employment of talc as the filling material, other suitable fillers or carriers or extending material, such as various materials ground to a very fine or impalpable powder or in a comminuted state being suitable, which material is, for many purposes, preferably free from gritty or hard particles, and is preferably of a flour-like texture. Material having a smooth, substantially unctuous feel is preferred.

The composition thus produced is susceptible of a great variety of uses and modifications, one form being suitable for use as a phonograph record composition or as an ingredient thereof.

Among the mineral fillers which may be employed are barytes, terra alba, clay and the like, all in a suitably comminuted or powdered or impalpable condition. The invention is not however limited to the use of mineral fillers.

As in my application above referred to, waxes, resins, metallic soaps, pitches and other or organic plastic substances may also be added if desired, in suitable quantities.

While I have mentioned a mixture of cottonseed and corn oils to be hydrogenated, the invention is by no means restricted to these specific oils; other oils, either animal, fish or vegetable (fatty oils), especially the semi-drying oils, may be employed, including sperm, menhaden, cod, cod liver, porgy, whale, almond, rape, castor, sesame, olive, soy bean, linseed, Chinese wood and mustard oil; also tallow, lard and other greases and oils. The invention also contemplates the employment of various mixtures of these oils, in addition to the specific mixture above specified, for example, castor and whale, castor and cottonseed or equivalent mixtures. If desired, the ingredients may be admixed by the aid of heat, as by melting the fatty material to enable the suitable incorporation of the solid non-fatty material. Thus, for instance, the fatty material is melted into contact with the talc, or other desired comminuted material employed, and solidified therewith. Hydrogenation is preferably carried to a point where the iodin number of the oil or oil mixture is reduced well below 50, or even to an iodin number of 25 or less. This is desirable because it tends to free the oil from any material amounts of components having siccative or drying properties and because of the better blending effect secured in many cases. Hydrogenation renders the material less susceptible to atmospheric influences. Cottonseed oil having an acid titre of 59 or 60 is a desirable ingredient of the composition. Obviously the catalyzer used for hardening the oil will be substantially or entirely removed from the hydrogenated oil before adding the talc or other finely-divided filling material.

The property of many highly hydrogenated oils to melt rather sharply without a protracted stage of viscosity and the non-necessity of heating to relatively high temperatures to secure a suitable degree of liquidity or mobility is often advantageous.

By the term "non-catalytic" as used herein is meant material not normally exerting catalytic properties like the finely divided nickel or palladium metal, or bodies used in the usual practice of hydrogenation of oils. The term "inert" is used to signify such a type of mineral or organic material employed with the hydrogenated oil to produce a form of the present composition of matter, as will be substantially without action on the oil, for example as would be the case with talc and the like.

To recapitulate, my invention comprises a composition of matter adapted for a wide variety of uses and capable of numerous modifications which comprises a fatty oil preferably a semi-drying oil hydrogenated or hardened preferably so as to have an iodin number of below 50 and in most cases preferably not materially over 25 so as to be preferably largely or substantially free from siccative bodies, incorporated with preferably at least a substantial proportion of a comminuted non-fatty (preferably non-gritty) solid material with which the hydrogenated oil is preferably intimately incorporated, as for example by being melted or solidified in contact therewith; said hydrogenated oil being of course, sufficiently freed from the catalytic material employed in its production.

What I claim is:

1. A composition of matter comprising hydrogenated fatty oil which is solid at normal temperature, in intimate admixture with an inert, non-gritty, non-fatty, non-catalytic solid material, insoluble in said oil.

2. A composition of matter comprising hydrogenated cottonseed oil of high melting point solidified in contact with an impalpable non-fatty solid material of a substantially unctuous feel.

3. A composition of matter comprising hydrogenated fatty oil, substantially free of catalyzer, solidified in contact with non-fatty solid material of a substantially flour-like texture.

4. A composition of matter comprising a non-fatty, non-catalytic, non-abrasive solid material and hydrogenated oil, solid at normal temperature and substantially free of hydrogenating-catalyzer, solidified into contact therewith.

5. A composition of matter comprising catalytically-hydrogenated fatty oil which is solid at normal temperature and is at least substantially freed of the catalytic body used to hydrogenate said oil, admixed with an influential proportion of finely-divided inert non-fatty mineral extending material, substantially devoid of catalytic properties, and of abrasive properties.

6. A composition of matter comprising hydrogenated fatty material having an iodin number not materially greater than 33, intimately mixed with powdered non-fatty, non-gritty, pulverulent material comprising talc.

7. A composition of matter comprising a mixture of at least two hydrogenated fatty oils having a fatty acid titre of at least 59, in intimate admixture with an impalpable non-fatty solid material.

8. A composition of matter comprising fatty oil material hydrogenated up to a fatty acid titre of not materially below 59°, such hydrogenated oil having an iodin number not over about 25, and being a brittle solid at ordinary room temperature, incorporated with not materially less than 40% of its weight of a comminuted soft non-fatty solid material, such composition being stable and not substantially affected by climatic changes.

9. A composition of matter comprising hydrogenated cottonseed oil of high melting point solidified in contact with an impalpable non-fatty inert solid material of an unctuous feel, said solid material being present in an amount in excess of said oil.

In testimony whereof I affix my signature.

CARLETON ELLIS.